Dec. 1, 1959   J. MÜLLER   2,915,317
MEASURING, GAUGING AND INSPECTION EQUIPMENT
Filed Sept. 17, 1958
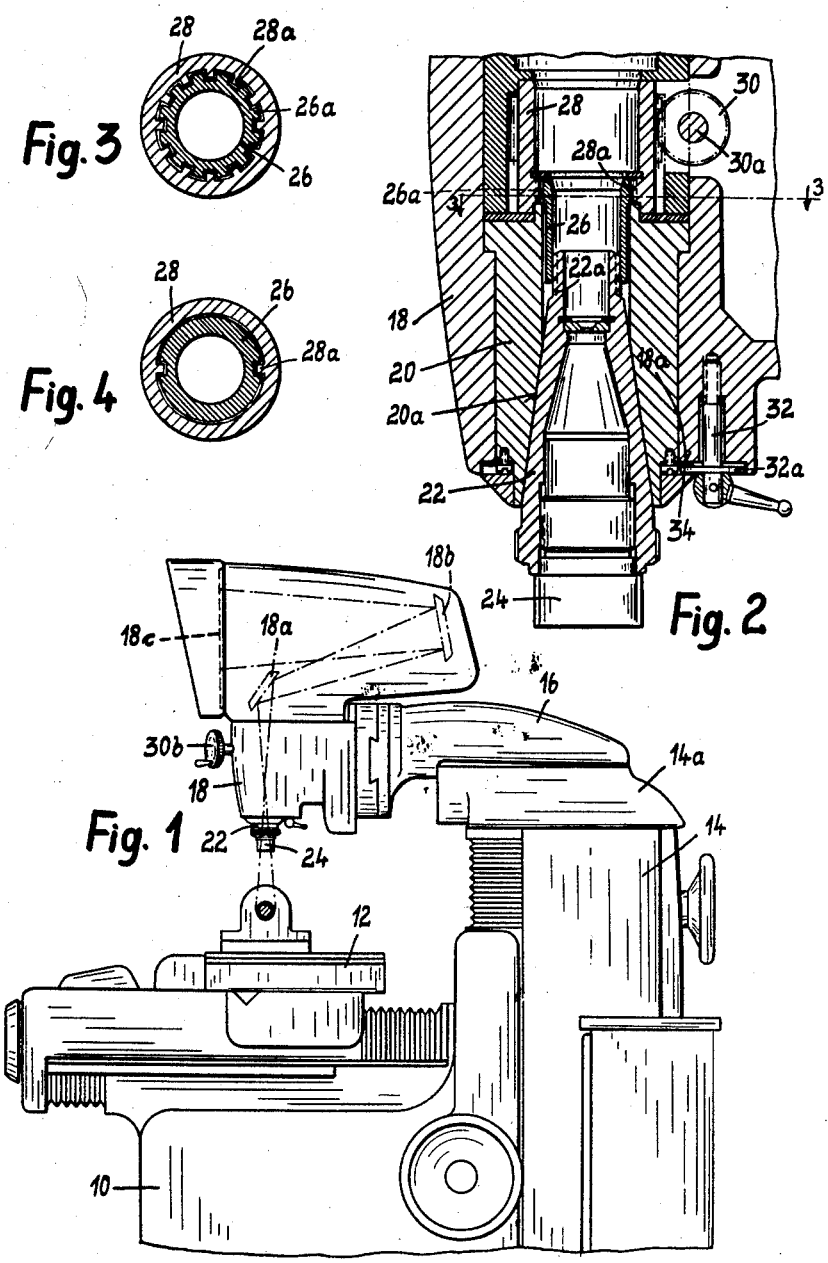

United States Patent Office 2,915,317
Patented Dec. 1, 1959

2,915,317

MEASURING, GAUGING AND INSPECTION EQUIPMENT

Johann Müller, Munich, Germany, assignor to Hans Deckel, Munich, Germany, and Friedrich Wilhelm Deckel, Zug, Switzerland Application September 17, 1958, Serial No. 761,569

4 Claims. (Cl. 279—9)

The present invention relates to measuring, gauging, and inspection equipment, especially to an optical measuring projector, comprising a fitting for the optional attachment thereto of alternative measuring and gauging means, such as a measuring microscope, a plunger gauge, and so forth.

It is the object of the invention to provide inspection and gauging equipment of the said kind with a fitting which will permit the equipment to be adjusted and clamped with a minimum of effort and trouble either in fixed position or for rotation. Another object of the invention is the provision of means which in the case of rotatable equipment will prevent inaccuracies in alignment between individual transmission elements from affecting the true central rotation of the gauging element and from causing dislocations and jamming. The invention also contemplates the provision of means which will permit the gauging element to be affixed and rotated with the help of a single control element so that the operations required for setting up and using the equipment will be reduced to a few simple manipulations.

The invention solves the objects set forth above by embodying the fitting for the reception of optionally attachable alternative measuring and gauging elements in a rotatably mounted adapter associated with means for rotating and means for clamping the same in any desired position. According to another feature of the invention the means which establish the connection between the adapter and the cooperating transmission means for imparting rotation thereto are arranged to permit relative radial displacement. To fix the adapter in a given position it is preferred to make use of a member which is fixed to the rotatable adapter, particularly in the form of a flat ring which can be pressed against a cooperating stationary surface by means of a clamping screw.

Other features of the invention will be hereinafter described with reference to an illustrative embodiment thereof shown in the accompanying drawings in which Fig. 1 represents measuring and inspection equipment attached for instance to a jig drilling machine.

Fig. 2 shows the adapter for the reception of the optionally attachable measuring means in section.

Fig. 3 is a cross-section of a portion of the apparatus shown in Fig. 2 taken on the line 3—3 thereof; and Fig. 4 is a cross-section similar to Fig. 3 showing a modified form of coupling.

Fig. 1 represents a jig drilling machine 10 equipped with a working table 12 which can be traversed in two horizontal directions. A gear box 14 is vertically displaceably mounted on the supporting column of the machine and provided with horizontal V guides in which a detachable working head such as a drill or grinding head can be slidably moved when the machine is engaged in jig drilling work or the like. However, when this jig drilling machine is to be used as a measuring machine, the machining head in the guides of part 14a is replaced by an arm 16 for supporting a measuring and gauging head 18. The latter is arranged to be slidably shiftable and rotatable on arm 16 in guide means which are not specially indicated by reference numerals. Substantially the measuring and gauging equipment comprises a support for optionally fitting the measuring and gauging means required for carrying out the intended measurement or inspection, such as a measuring microscope, a plunger gauge, or the like. For instance, an optical magnifying system may be fitted into the support for projecting via interposed deflecting means 18a, 18b, a magnified image of the measured object, clamped to the working table 12 and illuminated by reflected or transmitted light, on to a ground glass screen 18c. By traversing the working table the tested object can be moved in coordinate directions and placed in the desired position under the measuring and gauging equipment.

An optical projection equipment of this kind is well known as such and requires no detailed description.

The fitting for mounting the optionally attachable measuring and gauging means must be rotatable as well as capable of being clamped in any position to permit rotatable or fixed measuring and gauging elements to be brought into position during the measurement or test. According to the invention this fitting is therefore embodied in a rotatably mounted adapter associated with a gearing for imparting rotation to the same and with clamping means for locating it in any angular position. The structural details of this arrangement will now be described.

In the casing 18 of the measuring and gauging equipment is an adapter sleeve 20, mounted in such a way that it can be rotated but not axially displaced. The adapter sleeve 20 has a taper bore 20a into which the conformably shaped cone-shaped holder 22 for the measuring and gauging means can be inserted and in which it can be fixed. In the illustrated example the holder 22 contains a magnifying optical lens system in a mount 24 for magnifying the image of the tested object and projecting it on to a ground glass screen 18c. The beam of light passes axially through the hollow interior of parts 22, 20—as indicated in Fig. 1.

For securing the holder 22 in the adapter 20 an internally threaded bush 26 is provided which engages cooperating threads 22a at the upper end of the holder 22. The threaded bush has peripheral gear teeth 26a which engage the teeth of an internal gear ring 28. The latter is rotatable by means of a worm 30 or the like mounted on a shaft 30a which projects from casing 18 and carries a handwheel 30b (Fig. 1).

The holder 22 is fitted into the adapter sleeve 20 by being pushed into the same until the two threaded parts 26 and 22 engage. The holder 22 is now held in this position with one hand whilst wheel 30b is rotated with the other hand until the holder 22 has been completely pulled into the adapter sleeve 20 and thus fixed. If the holder 22 is now released any further rotation of the handwheel 30b will cause the holder 22 together with the adapter sleeve 20 and the measuring or gauging equipment to revolve.

In the illustrated example rotation of the optical system 24 and hence of parts 20, 22 will of course not be required so that these can be clamped and the rotating means inactivated. The clamping device consists of a clamping screw 32 with a collar 32a located inside casing 18 in such manner that the collar slightly overlaps the edge of a flat ring 34 affixed to the adapter sleeve. When the clamping screw 32 is loosened the flat ring 34 will clear the edge of collar 32a. However, when the clamping screw 32 is tightened, its collar 32a will bear on ring 34 and press it tightly against a cooperating surface 18a of the casing, thus preventing rotation of the clamping sleeve 20. It will be readily understood that several such clamping screws 32 may be distributed around the periphery of the adapter sleeve 20 should this be considered desirable.

If in another case a rotatable plunger gauge or the like is to be substituted for the optical system, then the holder of the gauge is similarly fitted into the adapter 20. But the clamping screw 32 must then be loosened to permit the plunger gauge to be rotated when handwheel 30b is turned.

To prevent any inaccuracies in the precision of the transmission train for manual rotation from affecting the accuracy of location of parts 20 and 22, the gear teeth 26a of the threaded bush 26 and the cooperating teeth 28a of the internal gear ring 28 are adapted to mate with a certain amount of play in such manner that the torque will be transmitted but that radial displacement is possible. This arrangement ensures that the rotary movement will actually be transmitted from the hand wheel 30b to bush 26, but that lateral pressure or the like which could be transmitted to parts 22 and 20 and push them out of alignment will not be applied to the bush. Consequently a true central rotation of the adapter elements, unaffected by any inaccuracies in the transmission will be assured.

The complete annular gear coupling between parts 26 and 28 may be replaced as shown in Fig. 4 by discrete teeth provided at only two or a limited number of engaging points between said two parts. Moreover, the tooth profile may be of a different shape to that actually illustrated in the drawings.

The construction of the adapter for fitting the measuring and gauging means according to the invention provides the major advantage that either rotatable or non-rotatable measuring elements can be fitted therein for carrying out a measurement or test. In one case rotation can be effected by turning the handwheel, whereas in the alternative case the clamping means can be used to fix the parts and to prevent rotary motion. Another advantage inherent in the proposed equipment consists in that the retention and fixation of the holder for the gauge or measuring elements in the adapter as well as the transmission of rotary movement thereto can be effected with the help of a single manipulating element, namely the handwheel. The testing and gauging equipment is therefore extremely easy to handle and a few simple manipulations suffice for fixing the equipment in position as well as for operating the same.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A holder adapted to releasably receive any one of various measuring and gauging optional attachments, said holder comprising a detachable head, an adapter sleeve mounted in said head so as to be freely rotatable but not displaceable in an axial direction, said adapter sleeve having a central bore including an outwardly tapering outer end portion, a gear ring mounted within said head for rotation independent of the rotation of said adapter sleeve and concentric therewith, manually operable means operatively connected to said gear ring for rotating said gear ring, a cylindrical bushing disposed partly within said gear ring and adapter sleeve, gear teeth means for rotating said bushing in response to rotation of said gear ring, a cone-shaped tubular attachment holder having an outer frusto-conical surface releasably wedged in said tapering bore end portion of said adapter sleeve, thread means for connecting adjacent ends of said holder and bushing and operative to draw said holder into said adapter sleeve in response to operation of said manually operable means, said holder being wedged in said adapter sleeve for rotation therewith in response to subsequent operation of said manually operable means.

2. A construction as defined in claim 1 in which said gear teeth means are relatively displaceable in a radial direction.

3. A construction as defined in claim 1 including means for clamping said adapter sleeve in a desired angular orientation, said clamping means comprising a flat ring fixed to said adapter sleeve and a clamping screw mounted on said head for movement into and out of clamping engagement with said flat ring.

4. A holder adapted to releasably receive any one of various measuring and gauging optional attachments, said holder comprising a detachable head, an adapter sleeve mounted in said head so as to be freely rotatable but not displaceable in an axial direction, said adapter sleeve having a central bore including a cylindrical inner end portion and an outwardly tapering outer end portion, a cylindrical gear ring mounted within said head and bearing on the inner end of said adapter sleeve for rotation independent of that of said adapter sleeve and concentric therewith, an externally accessible hand wheel geared with said gear ring for manually rotating said gear ring, a cylindrical bushing disposed within adjacent gear ring, a cylindrical bushing disposed within adjacent end portions of said adapter sleeve and gear ring, gear teeth means relatively displaceable in a radial direction for rotating said bushing with said gear ring, a cone-shaped tubular attachment holder having an outer frusto-conical surface releasably wedged in said tapering bore end portion of said adapter sleeve and having an inner cylindrical end portion, thread means for connecting adjacent ends of said holder and bushing and operative to draw said holder into said adapter sleeve in response to actuation of said handwheel, said holder being wedged in said adapter sleeve for rotation therewith, and manually operable clamping means carried by said head and acting on said adapter sleeve for clamping said holder in any desired angular position.

References Cited in the file of this patent

UNITED STATES PATENTS

| | | |
|---|---|---|
| 1,260,130 | Bemis | Mar. 19, 1918 |
| 1,507,381 | Jannell | Sept. 2, 1924 |
| 2,429,617 | Gustafson | Oct. 28, 1947 |